United States Patent [19]
Bray

[11] 3,887,468
[45] June 3, 1975

[54] FEED WATER CHLORINATOR FOR A REVERSE OSMOSIS SYSTEM

[75] Inventor: Donald T. Bray, Escondido, Calif.

[73] Assignee: Desalination Systems, Inc., Escondido, Calif.

[22] Filed: Aug. 16, 1974

[21] Appl. No.: 497,840

Related U.S. Application Data

[63] Continuation-in-part of Ser. No. 352,506, April 19, 1973, abandoned.

[52] U.S. Cl. .................. 210/206; 210/64; 424/249
[51] Int. Cl. ............................................. C02b 3/06
[58] Field of Search .......... 210/23, 60, 62, 64, 167, 210/169, 206, 321; 21/58, 78; 23/267 R, 267 B, 267 F; 424/249, DIG. 5

[56] References Cited
UNITED STATES PATENTS

| | | |
|---|---|---|
| 2,744,880 | 5/1956 | Brown............................ 210/206 X |
| 3,130,124 | 4/1964 | Ferris et al...................... 210/64 X |
| 3,296,069 | 1/1967 | Kowalski.......................... 210/64 X |
| 3,342,674 | 9/1967 | Kowalski.......................... 210/62 X |
| 3,426,901 | 2/1969 | Sherper............................. 210/169 |
| 3,488,420 | 1/1970 | Keast et al. ..................... 210/62 X |
| 3,506,764 | 4/1970 | Schneider ........................ 210/62 X |
| 3,550,782 | 12/1970 | Veloz............................. 210/321 X |

*Primary Examiner*—Thomas G. Wyse
*Attorney, Agent, or Firm*—Clement H. Allen

[57] ABSTRACT

A feed water chlorinator for a semipermeable membrane separation system employs a bactericide consisting essentially of a mixture of an organic fatty acid compound and a chlorisocyanuric acid compound compacted into a tube, as a container, open at least at one end. The bactericide-containing tube is located in the feed water piping so that the feed water flows over its open end or ends, and may be arranged as a side arm in the feed water inlet pipe, or located inside a filter in the feed water inlet pipe.

9 Claims, 4 Drawing Figures

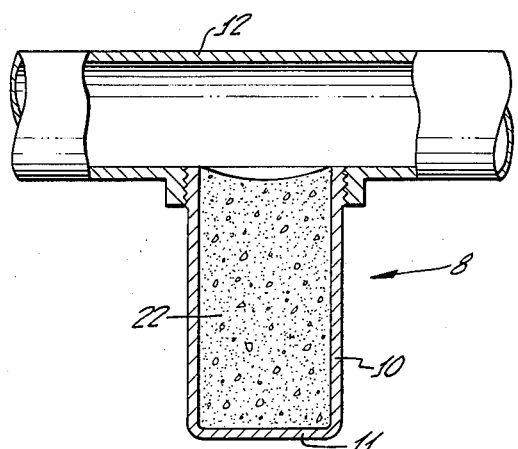
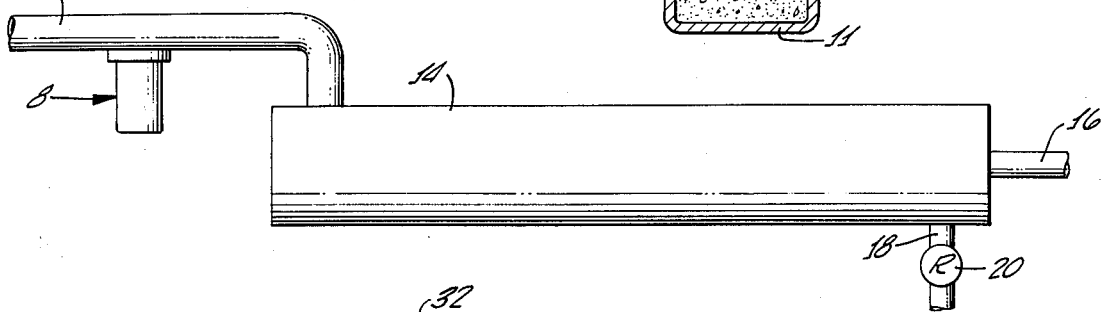
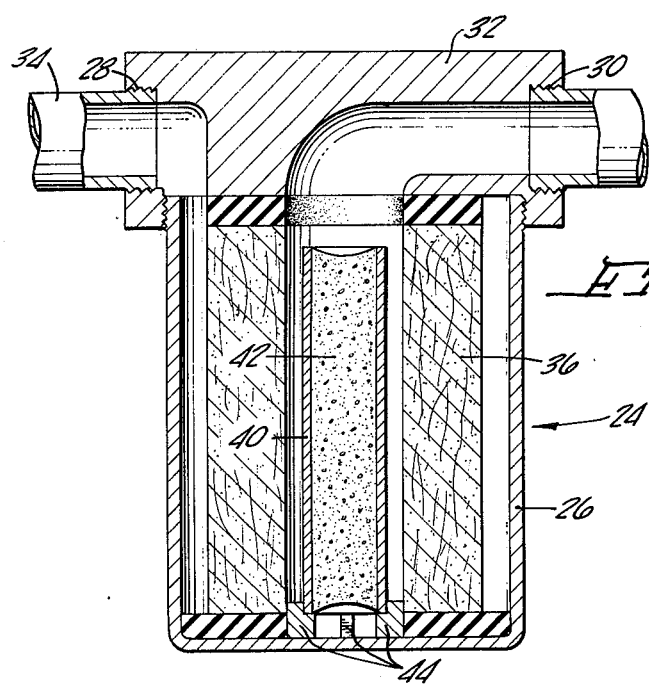
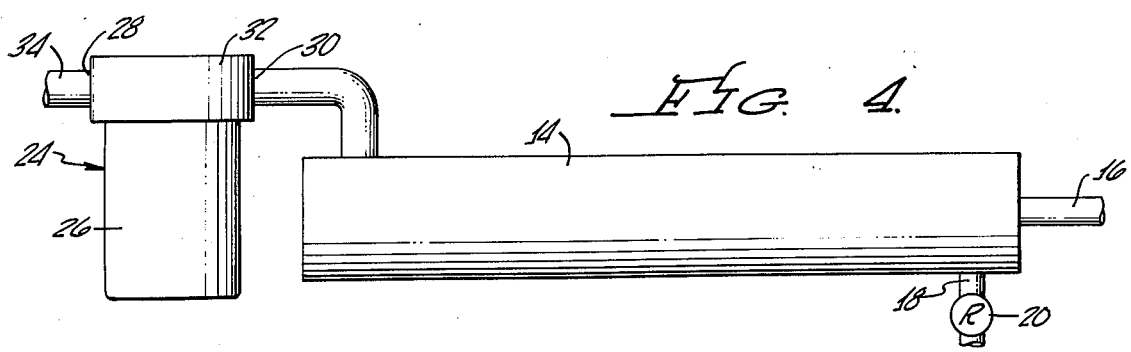

FEED WATER CHLORINATOR FOR A REVERSE OSMOSIS SYSTEM

CROSS REFERENCE

This application is a continuation-in-part of my copending application Ser. No. 352,506, filed Apr. 19, 1973, now abandoned.

BACKGROUND OF THE INVENTION

1. The Field of the Invention

This invention relates to chlorination of feed water in reverse osmosis and ultrafiltration systems.

2. The Prior Art

Reverse osmosis and ultrafiltration treatment systems which employ semipermeable membranes, are often subject to contamination by bacteria and other organisms. Chlorination of the feed water before treatment can eliminate or reduce bacteria and other similar growth, but the feed water should contain only a very small chlorine content, of the order of 0.25 to 10 parts per million. This amount of chlorine should be introduced into the feed water automatically and continually as it is used, for an extended period which may be at least six months and preferably up to a year or more. Reverse osmosis systems installed, for example, to produce a few gallons of very pure water for household use must operate for long periods of time without attention, service or addition of chemicals.

Chlorination of water has been practiced for a long time, of course; for example, in treatment of municipal supplies, and also more recently, in chlorination of swimming pools. Municipal supply chlorination most often involves direct addition of chlorine or a soluble chlorine compound in substantial amounts to large volumes of water. Swimming pool treatment has employed reduced solubility chlorine compounds or mixtures, but these have lasted often for only a few days of chlorine introduction, and at most, generally a few weeks. Since swimming pools require cleaning and servicing at frequent intervals, use of a relatively short life chlorine additive is not disadvantageous for this particular use. Thus for swiming pool treatment, the chlorine addition rate may not be constant since relatively large amounts of treatment chemicals may be added intermittently.

This invention introduces an extremely small, well regulated amount of chlorine into the feed water of a reverse osmosis or ultrafiltration system automatically and continually as the feed water is used, over an extended period of at least six months and up to a year or more without service or attention.

SUMMARY OF THE INVENTION

Summarized briefly, this invention contemplates apparatus for introduction of from about 0.25 to about 10 parts per million of chlorine into the feed water of a semipermeable membrane separation system continually as the feed water is used over an extended period of time, which may be at least 6 months and up to a year or more. This is accomplished by providing a receptacle in the feed water supply pipe, forming or containing a tube having at least one open end and containing a compacted bactericide consisting essentially of a mixture of from more than 2 percent and up to about 10 percent by weight of a fatty acid compound selected from the group consisting of ethylene glycol monostearate, diethylene glycol stearate, sorbitan monopalmitate, sorbitan monostearate, sorbitan tristearate and glyceryl monostearate, balance a chloroisocyanuric acid compound selected from the group consisting of sodium dichloroisocyanurate, potassium dichloroisocyanurate, dichloroisocyanuric acid and trichloroisocyanuric acid. Feed water flows over the exposed, open end area of the bactericide-containing tube and is introduced into a module containing a semipermeable membrane. Preferably the fatty acid compound is glyceryl monostearate and the chloroisocyanuric acid compound is trichloroisocyanuric acid. Preferably, the open end area of the bactericide-containing tube is in the ratio of about one square inch for each 50 to 500 gallons per day of feed water flowing over it. The bactericide-containing tube may advantageously be arranged as or in a side arm connected to the pipe through which the feed water flows, or located inside the central bore of a filter in the pipe through which the feed water flows.

BRIEF DESCRIPTION OF THE DRAWINGS

In the drawings:

FIG. 1 shows a central vertical cross section of an embodiment of this invention in which a tube containing compacted bactericide is arranged as a side arm connected to a pipe through which feed water for a semipermeable membrane system flows.

FIG. 2 shows diagramatically a semipermeable membrane system including the side arm bactericide-containing tube of FIG. 1.

FIG. 3 shows a central vertical section of another embodiment of this invention in which a tube with both ends open containing compacted bactericide is located inside a filter through which feed water for a semipermeable membrane system flows.

FIG. 4 shows diagramatically a semipermeable membrane system including the filter with bactericide-containing tube of FIG. 3.

DESCRIPTION OF PREFERRED EMBODIMENTS

Referring now to FIGS. 1 and 2, a receptacle in the form of a side arm 8, comprising an open top tube 10 with closed bottom 11, is screwed or otherwise sealingly fastened or connected into the sidewall of pipe 12 and communicates with the interior thereof. Pipe 12 transfers pressurized feed water into a conventional module 14 contains a semipermeable membrane cartridge as, for example, of the well known and commercially available spiral wound type. Purified water produced in module 14 is released through product water outlet 16 to storage or use, and concentrate or brine from module 14 is released through pipe 18. Restrictor 20, which may be of the orifice or small diameter tube type or may be a back pressure control valve, releases concentrate while maintaining operating pressure in module 14 and is arranged in pipe 18, which can be led to sewer or drain. Side arm tube 10 contains a bactericide 22 which consists essentially of a compacted mixture of a fatty acid compound and a chloroisocyanuric acid compound as described in more detail hereinafter.

Referring now to FIGS. 3 and 4, a receptacle 24 in the form of a filter casing 26 having inlet 28 and outlet 30 arranged in its removable top 32, is connected into and communicates with feed water pipe 34 which supplies or introduces pressurized feed water into semipermeable membrane module 14. Module 14, as in the embodiment of FIG. 2, has purified water outlet 16 and concentrate release outlet pipe 18 with flow control or restrictor 20. Inside filter casing 26 is a tubular filter element 36 which may conventionally be formed of layers of spiral windings of natural or synthetic fibers with interstices small enough to hold back or retain particles of unwanted size. Inside the bore of filter element 36 is arranged a tube 40 open at both ends as shown and containing compacted bactericide 42 as described in detail hereinafter. The bottom of tube 40 is raised up or spaced apart from the bottom of filter casing 26 by separated supports 44 to allow water passing through filter element 36 to contact the open bottom of tube 40 as well as to flow over its open top.

The feed water piping shown in both FIGS. 2 and 4 with the bactericide-containing tube in either the side arm or the filter, is designed preferably so that the open end area of either tube 10 in FIG. 1 or tube 40 in FIG. 3 will be one square inch for each 50 to 500 gallons per day of feed water flowing through feed water pipe 12 or 34. This will provide from about 0.25 to about 10 parts per million by weight of chlorine in the feed water and will be suitable amount to control or eliminate bacteria and other growth in a semipermeable membrane system such as shown in FIGS. 2 and 4 through the feed water passes. Less than about 0.25 parts per million of chlorine will not be sufficient to provide proper bacteria growth control while more than 10 parts per million will be excess of that needed, will be uneconomical, and of no additional benefit.

The bactericide employed in the practice of this invention is important to obtain the improved results, and consists essentially of from more than 2 percent to about 10 percent by weight of a fatty acid compound selected from the group consisting of ethylene glycol monostearate, diethylene glycol stearate, sorbitan monopalmitate, sorbital monostearate, sorbitan tristearate and glyceryl monostearate, balance a chloroisocyanuric acid compound selected from the group consisting of sodium dischloroisocyanurate, potassium dichloroisocyanurate, dichloroisocyanuric acid and trichloroisocyanuric acid, compacted into a tube as a container having at least one open end. Feed water is flowed over the open end area of the bactericide-containing tube, and the chlorinated feed water is introduced into a semipermeable module. Preferably, the fatty acid compound is glyceryl monostearate and the chloroisocyanuric acid compound is trichloroisocyanuric acid.

The fatty acid compounds employed in the bactericide according to this invention are all solid materials, available in subdivided form such as beads, flakes, granules or powder, and therefore readily adopted for forming a mixture with solid, subdivided chloroisocyanuric acid compound. The proportions of fatty acid compound and cyanuric acid compound are critical. The fatty acid compound is present in an amount greater than is normally used for a fatty acid compound employed as briquetting lubricant, and which is generally 2 percent or less by weight. The larger amount of fatty acid compound employed in the bactericide of this invention appears to control, or assist in control of release of chlorine from the chloroisocyanuric acid compound. Two percent or less of the fatty acid compound will produce a bactericide with a life that is too short to be satisfactory. More than 10 percent will provide a bactericide with adequate life but the dissolution rate will be impractically slow and the amount of chlorine added to the water will be too low. Additionally, the large proportion of fatty acid compound present may cause irregular break-down and dissolution of the mixture. The bactericide as described provides a composition with an extremely slow, controlled chlorine release rate, useful and very desirable in applications in which a water flow must be chlorinated continually over a period of many months with no addition or replacement of chemicals or servicing.

Preferably, the mixture of fatty acid compound and chloroisocyanuric acid compound is compacted directly into its container tube for example tube 10 in FIG. 1 and 40 in FIG. 3. This may be accomplished by introducing portions of an intimate mixture of these ingredients in granulated or powder form successively into the open top of tube 10 of FIG. 1 (the bottom being closed at 11) and compacting or briquetting by a piston forcing the mixture down into the tube under high pressure, for example, 3,000 to 6,000 pounds per square inch. In the case of the open bottom bactericide-container tube 40 employed in the embodiment of FIG. 3, a temporary bottom may be employed, for example, a solid plate or receptacle on or in which the tube 40 is placed for filling and then removed after filling with compacted mixture. An advantage of compacting directly into and against the interior wall of the container tube is that dissolution of the bactericide occurs substantially entirely only from the open end or ends of the container tube; the mixture, being very tightly compressed against the interior wall of the container tube prevents leaking and dissolution from the sides of the compacted body of bactericide.

As an example of the operation of this invention, a side arm tube as at 10 in FIG. 1, was filled with an intimate mixture 22 of 5 percent powdered glyceryl monostearate and balance powdered trichloroisocyanuric acid, and of which successive additions were compacted into tube 10 at a pressure of about 5,000 pounds per square inch. Tube 10 was of heavy wall plastic threaded at its top, with a closed bottom as at 11 in FIG. 1, and had an internal diameter of ⅝-inch providing an exposed area of bactericide of about 0.3 square inches. Its length was 6 inches. The top of tube 10 was screwed into a threaded hole in the wall of a pipe 12 carrying 25 gallons of water per day of municipal water under 100 psi pressure used as feed water introduced into a small reverse osmosis module 14 containing a spiral wound membrane cartridge used for purifying the municipal supply to produce about 5 gallons per day of a superior purified water of so-called bottled-water quality. The ratio of area of exposed bactericide to water flow in this example was one square inch to about 83 gallons per day water flow. The municipal feed water contained substantially no chlorine. The concentrate or brine flowing out of pipe 18 from module 14 was tested for chlorine content at intervals over a period of continuous operation of 8 months. For the initial month, the chlorine content of the concentrate averaged about 4 parts per million; after this, the chlorine content dropped to an apparently steady state content of between about 1 and about 2 parts per million. At the end of the 8 months without servicing or addition of chemicals including bactericide, the chlorine content of the concentrate still showed 0.4 parts per million of chlorine. At the end of the eighth month of operation, disassembly of module 14 showed no evidence of bacterial attack or algae growth. This method of controlling bacteria and algae growth in separation systems employing semipermeable membranes is extremely advantageous because the slow chlorine release over such a long period of time provides extended protection without attention.

It will be appreciated that the separation of about 20 percent of the reverse osmosis feed water as purified product water permeate would lead to calculation of the parts per million of chlorine actually introduced into the feed water as about 20 percent lower than the values determined in the concentrate water and shown above; that is for the first month, feed water introduction would be about 3.2 parts per million; for the steady state period, from about 0.8 to about 1.6 parts per million; and for the amount still being introduced after eight months, about 0.32 parts per million.

In operation of the embodiment illustrated in FIGS. 3 and 4, the same bactericide composition may be employed as in the embodiment of FIGS. 1 and 2. The effective dissolution rate of bactericide 42 from the open top of tube 40 in FIG. 3 may be somewhat greater than that from its open bottom. However, water will flow around and across the open bottom of tube 40 to some extent and thus supplement the chlorine addition obtained from the open top area.

The drawing of FIG. 3 shows the feed water flow from the outside surface of filter element 36 to the bore inside where it contacts bactericide 42 in tube 40. However, it will be appreciated that the feed water flow may be from either one of the outside surface and the bore of filter element 36 to the other. The preferred arrangement, however, is as illustrated since particles filtered out of the feed water will be retained on the outer surface of the filter element and separated from the bactericide-containing tube 40.

While the compacted mixture described herein as a bactericide will have elimination or control of bacteria as its principal function, it will also serve to introduce chlorine which will serve, at least to some degree, to kill algae, fungus, and other growths, organisms and parasites.

I claim:

1. In apparatus for treatment of a solution by a semipermeable membrane process and which comrises a module containing a semipermeable membrane, means for introducing feed water under pressure into said module, means for releasing purified water from said module, and means for releasing concentrate from said module; in which the improvement comprises:
   a. said means for introducing said feed water into said module comprising a pipe;
   b. a receptacle connected into and communicating with the interior of said pipe;
   c. said receptacle enclosing a tube having at least one open end exposed to the feed water flowing through said pipe;
   d. said tube containing a bactericide consisting essentially of a compacted mixture of more than 2 percent and up to 10 percent by weight of a fatty acid compound selected from the group consisting of ethylene glycol monostearate, diethylene glycol stearate, sorbitan monopalmitate, sorbitan monostearate, sorbitan tristearate and glyceryl monostearate, balance a chloroisocyanuric acid compound selected from the group consisting of sodium dichloroisocyanurate, potassium dichloroisocyanurate, dischlroisocyanuric acid and trichloroisocyanuric acid.

2. Apparatus according to claim 1, in which said fatty acid compound is glyceryl monostearate.

3. Apparatus according to claim 2, in which said cyanuric compound is trichloroisocyanuric acid.

4. Apparatus according to claim 1, in which the said receptacle is formed as a side arm having a closed bottom and an open top connected into said pipe, said side arm forming the tube containing said bactericide.

5. Apparatus according to claim 1, in which said tube contains said bactericide compacted into and against the interior wall of said tube.

6. Apparatus according to claim 1, in which the open end area of said tube is in the ratio of about one square inch for each 50 to 500 gallons per day of feed water flowing through said pipe.

7. Apparatus according to claim 1, in which said receptacle encloses a filtering element having a central bore, and through which the said feed water passes from one of said bore and the outside surface of said filtering element to the other, and a tube having at least one open end and containing compacted bactericide arranged inside the bore of said filter element.

8. Apparatus according to claim 7, in which said tube has both its ends open.

9. Apparatus according to claim 8, in which the bottom of said tube is spaced apart from the bottom of said receptacle by separated supports.

* * * * *